United States Patent
Wang et al.

(10) Patent No.: US 9,477,349 B2
(45) Date of Patent: Oct. 25, 2016

(54) TOUCH PANEL AND TOUCH DISPLAY DEVICE HAVING THE SAME

(75) Inventors: Chiung-Han Wang, Kaohsiung County (TW); Shau-Yu Tsai, Taipei (TW); Chih-Wei Chien, Taoyuan County (TW); Wei-Tien Chang, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 1532 days.

(21) Appl. No.: 12/829,377

(22) Filed: Jul. 1, 2010

(65) Prior Publication Data

US 2011/0037730 A1 Feb. 17, 2011

(30) Foreign Application Priority Data

Aug. 12, 2009 (TW) ................................ 98127207 A (51) Int. Cl.
*G06F 3/042* (2006.01)

(52) U.S. Cl.
CPC ... *G06F 3/0428* (2013.01); *G06F 2203/04109* (2013.01)

(58) Field of Classification Search
CPC ...... G06F 3/041; G06F 3/042; G06F 3/0421; G06F 3/0428; G06F 2203/04109; G02B 6/00
USPC .................. 345/173, 175–176; 178/18.09
See application file for complete search history.

(56) References Cited

U.S. PATENT DOCUMENTS

| | | | |
|---|---|---|---|
| 5,961,198 A | 10/1999 | Hira et al. | |
| 6,317,204 B2 * | 11/2001 | Haga et al. | 356/237.2 |
| 7,087,878 B2 | 8/2006 | Nixon et al. | |
| 8,094,129 B2 | 1/2012 | Izadi et al. | |
| 8,368,663 B2 | 2/2013 | Izadi et al. | |
| 8,436,833 B2 * | 5/2013 | King et al. | 345/175 |
| 8,581,884 B2 * | 11/2013 | Fahraeus et al. | 345/176 |
| 2004/0252091 A1 * | 12/2004 | Ma et al. | 345/87 |
| 2005/0248540 A1 * | 11/2005 | Newton | G06F 3/0436 345/173 |
| 2006/0227120 A1 * | 10/2006 | Eikman | 345/175 |

(Continued)

FOREIGN PATENT DOCUMENTS

| | | |
|---|---|---|
| CN | 101169495 | 4/2008 |
| CN | 101441540 | 5/2009 |

(Continued)

OTHER PUBLICATIONS

"First Office Action of China Counterpart Applition," Issued on Sep. 17, 2010, p. 1-p. 9, in Which the Listed References Were Cited.

(Continued)

*Primary Examiner* — Jonathan Horner
(74) *Attorney, Agent, or Firm* — Jianq Chyun IP Office (57) ABSTRACT

A touch panel including a light guide plate, a plurality of light sources and a plurality of detectors is provided. The light guide plate has a top surface, a bottom surface, a plurality of side surfaces and a plurality of light incident surfaces. The light sources are disposed at the light incident surfaces of the light guide plate, and the light sources have a photocell total reflection angle ($\alpha$) and a photocell vertical divergence angle ($\beta$) corresponding to the light incident surfaces of the light guide plate, wherein $\theta < \alpha < 60°$, $\theta$ is a critical angle of the total reflection angle of the light guide plate, and $\beta < 50°$. The detectors are disposed corresponding to the light sources so as to receive photocell signals from the light sources.

24 Claims, 8 Drawing Sheets

(56) References Cited

U.S. PATENT DOCUMENTS

| | | |
|---|---|---|
| 2008/0088603 A1* | 4/2008 | Eliasson et al. ............ 345/176 |
| 2008/0122803 A1 | 5/2008 | Izadi et al. |
| 2008/0278460 A1* | 11/2008 | Arnett ................. G02B 6/0045 345/175 |
| 2010/0066704 A1* | 3/2010 | Kasai ..................... A63F 13/04 345/175 |
| 2010/0079407 A1* | 4/2010 | Suggs .......................... 345/175 |
| 2010/0134441 A1 | 6/2010 | Chen et al. |
| 2010/0214269 A1 | 8/2010 | Wang et al. |
| 2012/0075256 A1 | 3/2012 | Izadi et al. |

FOREIGN PATENT DOCUMENTS

| | | | |
|---|---|---|---|
| JP | WO 2008066004 A1 * | 6/2008 | ............ A63F 13/04 |
| TW | 407216 | 10/2000 | |
| TW | 200841227 | 10/2008 | |
| TW | 200846996 | 12/2008 | |
| TW | 200912200 | 3/2009 | |
| TW | M357662 | 5/2009 | |
| TW | M363032 | 8/2009 | |
| WO | 2009076503 | 6/2009 | |

OTHER PUBLICATIONS

"Office Action of Taiwan Counterpart Application", issued on Dec. 17, 2012, p. 1-p. 7, in which the listed references were cited.

"Office Action of Taiwan counterpart application" issued on Mar. 11, 2013, p. 1-p. 4, in which the listed references (TW200846996, TW200912200, and TW407216) were cited.

* cited by examiner

TOUCH PANEL AND TOUCH DISPLAY DEVICE HAVING THE SAME

CROSS-REFERENCE TO RELATED APPLICATION

This application claims the priority benefit of Taiwan application serial no. 98127207, filed on Aug. 12, 2009. The entirety of the above-mentioned patent application is hereby incorporated by reference herein and made a part of this specification.

BACKGROUND OF THE INVENTION

1. Field of the Invention

The present invention relates to a touch panel and a touch display device having the same, and more particularly to an optical touch panel and a touch display device having the same.

2. Description of Related Art

With rapid developments and applications of the information technology, wireless mobile telecommunication, and information appliances, the input devices of many information products are changed from a traditional keyboard, a mouse and so forth to touch devices, so as to satisfy the requirements of convenience in carrying, light weight, and user-friendly operations. At present, touch panels can be generally categorized into resistance touch panels, capacitance touch panels, sound wave touch panels, optical touch panels, electromagnetic touch panels, etc. Each of the aforementioned touch panels can be externally assembled with a display panel to form a touch display device.

One type of the optical touch panels is that light sources and CMOS detectors are used to sense touch positions. In this type of optical touch panel, a frame is disposed above the display panel, and the light sources and the CMOS detectors are disposed at the corners of the frame. However, the inner portion of the frame is a hallow structure. This optical touch panel is usually twisted because it does not have enough mechanical strength. In addition, the CMOS detectors of the optical touch panel have a vertical receiving angle, and thereby an error sensing signal may be generated when a finger has not touched the surface of the touch panel yet, but the finger is at the light path of the light sources and at the receiving region of the CMOS detectors.

SUMMARY OF THE INVENTION

The present invention is directed to a touch panel and a touch display device having the same capable of resolving the problems of that the conventional optical touch panel is easily twisted and the error sensing signal is easily generated in the prior art.

The present invention is directed to a touch panel and a touch display device having the same capable of increasing sensing sensitivity.

A touch panel including a light guide plate, a plurality of light sources and a plurality of detectors is provided. The light guide plate has a top surface, a bottom surface, a plurality of side surfaces and a plurality of light incident surfaces. The light sources are disposed at the light incident surfaces of the light guide plate, and the light sources have a photocell total reflection angle ($\alpha$) and a photocell vertical divergence angle ($\beta$) corresponding to the light incident surfaces of the light guide plate, wherein $\theta<\alpha<60°$, $\theta$ is a critical angle of the total reflection angle of the light guide plate, and $\beta<50°$. The detectors are disposed corresponding to the light sources so as to receive photocell signals from the light sources.

A touch display device including a display panel and a touch panel disposed above the display panel is provided. The touch panel includes a light guide plate, a plurality of light sources and a plurality of detectors. The light guide plate has a top surface, a bottom surface, a plurality of side surfaces and a plurality of light incident surfaces. The light sources are disposed at the light incident surfaces of the light guide plate, and the light sources have a photocell total reflection angle ($\alpha$) and a photocell vertical divergence angle ($\beta$) corresponding to the light incident surfaces of the light guide plate, wherein $\theta<\alpha<60°$, $\theta$ is a critical angle of the total reflection angle of the light guide plate, and $\beta<50°$. The detectors are disposed corresponding to the light sources so as to receive photocell signals from the light sources.

A touch panel including a light guide plate, a plurality of light sources and a plurality of detectors is provided. The light guide plate has a top surface, a bottom surface, a plurality of side surfaces and a plurality of light incident surfaces. The light sources are disposed at the light incident surfaces of the light guide plate, and photocells of the light sources have a total reflection bouncing distance (D) in the light guide plate, and $D\leq10$ mm. The detectors are disposed corresponding to the light sources so as to receive photocell signals from the light sources.

A touch display device including a display panel and a touch panel disposed above the display panel is provided. The touch panel includes a light guide plate, a plurality of light sources and a plurality of detectors. The light guide plate has a top surface, a bottom surface, a plurality of side surfaces and a plurality of light incident surfaces. The light sources are disposed at the light incident surfaces of the light guide plate, and photocells of the light sources have a total reflection bouncing distance (D) in the light guide plate, and $D\leq10$ mm. The detectors are disposed corresponding to the light sources so as to receive photocell signals from the light sources.

In view of the above, the light guide plate is disposed in the touch panel of the present invention, and therefore it has better mechanical strength and is not twisted easily comparing with the conventional optical touch panel having the hallow frame. Moreover, the light sources of the touch panel have a photocell total reflection angle ($\alpha$) and a photocell vertical divergence angle ($\beta$), wherein $\theta<\alpha<60°$, $\theta$ is a critical angle of the total reflection angle of the light guide plate, and $\beta<50°$. When photocells of the light sources enter the light guide plate, the photocells perform total reflection in the light guide plate, and then the detectors may detect the photocell signals from the light sources. Therefore, the problem of generating the error sensing signals in the conventional optical touch panel can be avoided. Moreover, because the photocells of the light sources have a total reflection bouncing distance $(L)\leq10$ mm in the light guide plate, the sensing sensitivity of the touch panel is increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
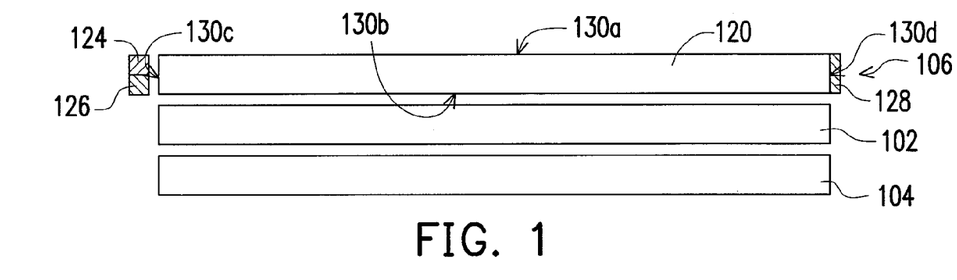
FIG. 1 is a side view of a touch display device according to an embodiment of the present invention.
Figure 2:
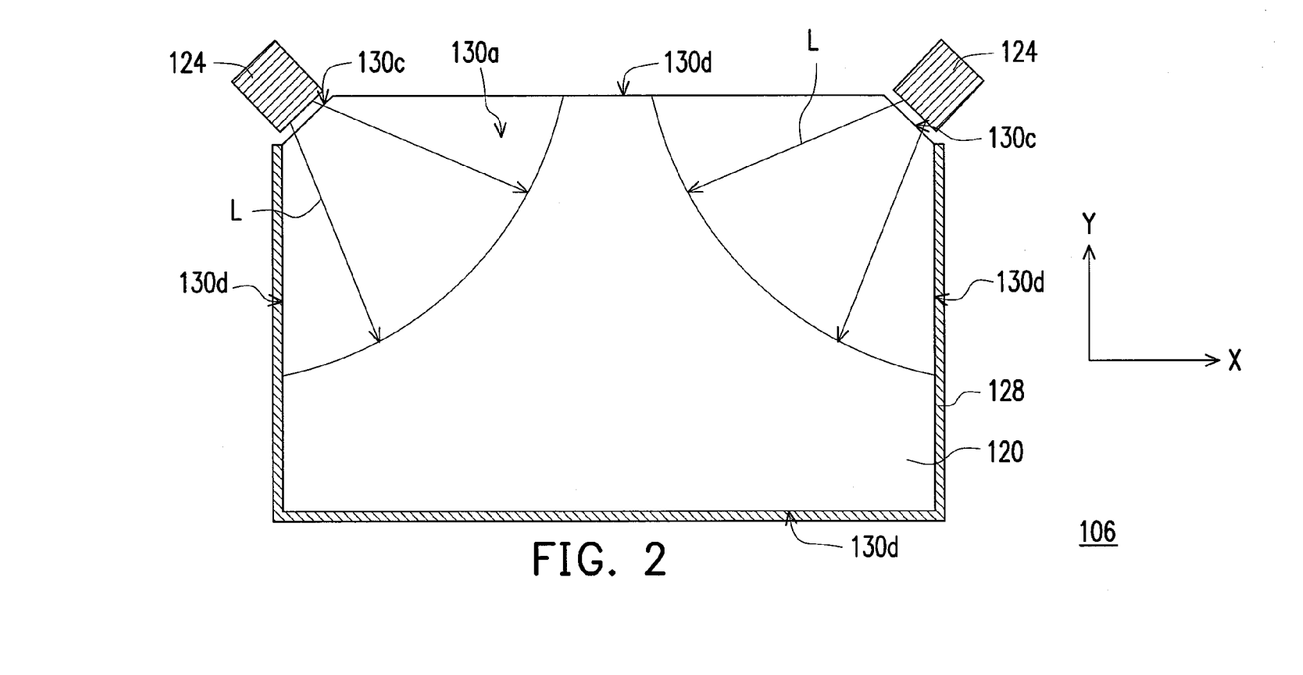
FIG. 2 is a top view of the touch panel of the touch display device shown in FIG. 1.

FIG. 1 is a side view of a touch display device according to an embodiment of the present invention. FIG. 2 is a top view of the touch panel of the touch display device shown in FIG. 1. Referring to FIG. 1 and FIG. 2, the touch display device comprises a display panel 102 and a touch panel 106 disposed above the display panel 102. If the display panel 102 is a transmissive display panel or a transflective display panel, the touch display device further comprises a backlight module 104 disposed under the display panel 102. If the display panel 102 is a reflective display panel, the backlight module 104 can be omitted. Therefore, the backlight module 104 is not the essential element of the touch display device.

According to the embodiment, the display panel 102 is a liquid crystal display panel and comprises an upper substrate, a lower substrate and a liquid crystal layer between the two substrates. Generally, the lower substrate is an active device array substrate comprising scan lines, data lines, active devices electrically connected to the scan lines and the data lines, and pixel electrodes electrically connected to the active devices. The upper substrate may be a color filter substrate, a substrate having an electrode layer thereon, or a blank substrate. The lower substrate and the upper substrate may respectively be any type of substrate in well known liquid crystal display panel. Moreover, the backlight module 104 disposed under the display panel 102 may be a direct type backlight module or an edge type backlight module. In other embodiments, the display panel 102 may be an organic electroluminescence display panel, a plasma display panel or other types of display panels.

The touch panel 106 includes a light guide plate 120, a plurality of light sources 124 and a plurality of detectors 126.

The light guide plate 120 has a top surface 130a, a bottom surface 130b, a plurality of light incident surfaces 130c and a plurality of side surfaces 130d, and the top surface 130a is disposed opposite to the bottom surface 130b, the light incident surfaces 130c and the side surfaces 130d are connected with the top surfaces 130a and the bottom surface 130b, as shown in FIG. 1 and FIG. 2. Because the light guide plate 120 is a flat structure, the areas of the top surface 130a and the bottom surface 130b are larger than the areas of the side surfaces 130d and the light incident surfaces 130c. In the embodiment, the light guide plate 120 has two light incident surfaces 130c, and each light incident surface 130c is disposed between the adjacent side surfaces 130d. However, the number of the light incident surfaces 130c of the light guide plate 120 is not limited in the present invention. The light guide plate 120 may have more than two light incident surfaces 130c in other embodiments. In addition, the light guide plate 120 comprises a transparent light guide material, such as polymethyl methacrylate (PMMA), polycarbonate (PC), glass or other transparent materials. The thickness of the light guide plate 120 depends on the product design or the material thereof.

The light sources 124 are disposed on the light incident surfaces 130c of the light guide plate 120. In the embodiment, each light source 124 is disposed on one of the light incident surfaces 130c correspondingly. The light source 124 may be light emitting diode (LED) light sources or other types of light sources, which may emit photocells L of infrared rays or photocells L having other wavelengths.

The detectors 126 are disposed corresponding to the light sources 124 so as to receive photocell signals from the light sources 124. The detectors 126 are complementary metal oxide semiconductor (CMOS) detectors, for example. In the embodiment, the detectors 126 are disposed underneath the light sources 124. A reflective layer 128 is further disposed on the side surfaces 130d of the light guide plate 120, such that the detectors 126 may receive the photocell signals from the light sources 124. In the embodiment, since the light sources 124 are disposed on the two light incident surfaces 130c, the reflective layer 128 may be disposed on three of the side surfaces 130d of the light guide plate 120 based on the light divergence of the light sources 124 on the XY plane, such that the photocells L from the light sources 124 may be reflected by the reflective layer 128, and the photocell signals can be detected by the detectors 126 disposed underneath the light sources 124. However, the present invention is not limited to this embodiment. In another embodiment, the reflective layer 128 may be disposed on all of the side surfaces 130d of the light guide plate 120. Furthermore, in a preferred embodiment, each detector 126 has a horizontal view angle larger than 90° and a vertical view angle of any angle. Herein, the horizontal view angle is referred to a view angle on the XY plane, and the vertical view angle is referred to a view angle in the Z direction.

Figure 3:
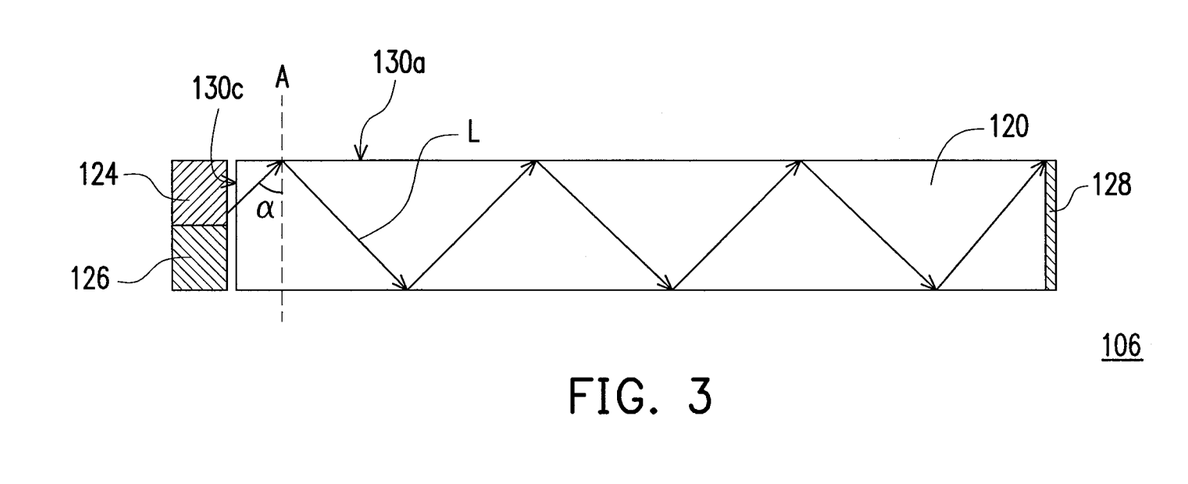
FIG. 3 and FIG. 4 are side views of the touch panel 106 shown in FIG. 1 and FIG. 2.
Figure 4:
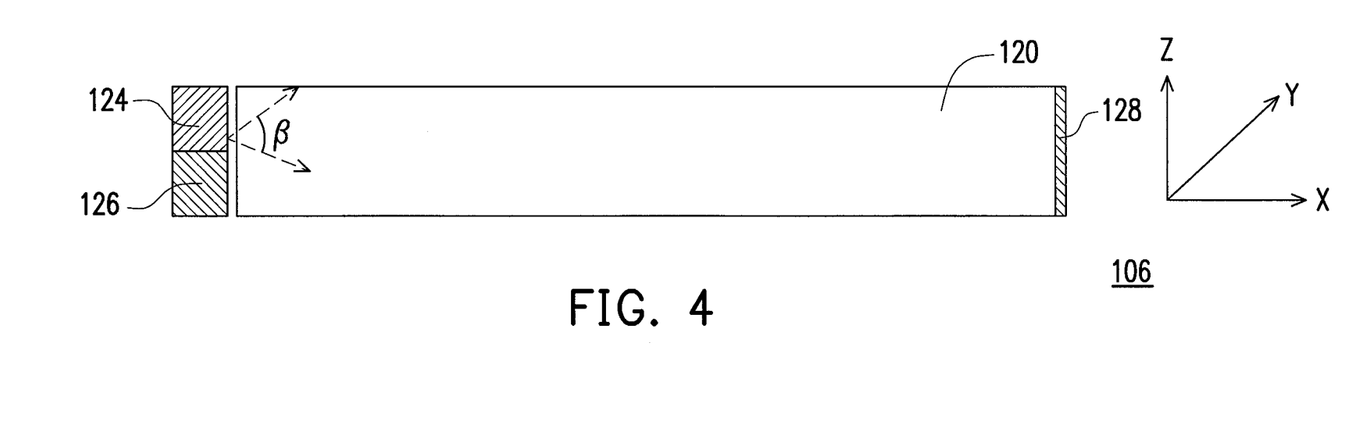

It is noted that, as shown in FIG. 3 and FIG. 4, the light sources 124 corresponding to the light incident surfaces 130c have a photocell total reflection angle (α) and a photocell vertical divergence angle (β). FIG. 3 and FIG. 4 are side views of the touch panel 106 shown in FIG. 1 and FIG. 2 for clearly illustration. Referring to FIG. 3, in the embodiment, the photocell total reflection angle (α) is a reflective angle of the photocell L on the top surface 130a of the light guide plate 120 after the photocell L from the light source 124 enters the light guide plate 12, which is also the angle between the light path of the photocell L and a vertical axis A. If the photocell total reflection angle (α) satisfies β<α<60° and θ is a critical angle of the total reflection angle of the light guide plate 120, the photocell L may continuously performs total reflection in the light guide plate 120. For example, if the material of the light guide plate 120 is PMMA, the critical angle of the total reflection angle θ is 41.8°. The photocell total reflection angle (α) satisfies 41.8°<α<60°.

In addition, as shown in FIG. 4, in the embodiment, the photocell vertical divergence angle (β) is a divergent angle of the photocell L from the light source 124 in the Z direction. The photocell vertical divergence angle (β) satisfies β<50°, such that the total reflection density of the photocell L in the light guide plate 120 may meet the required sensing sensitivity of the touch panel.

Figure 5:
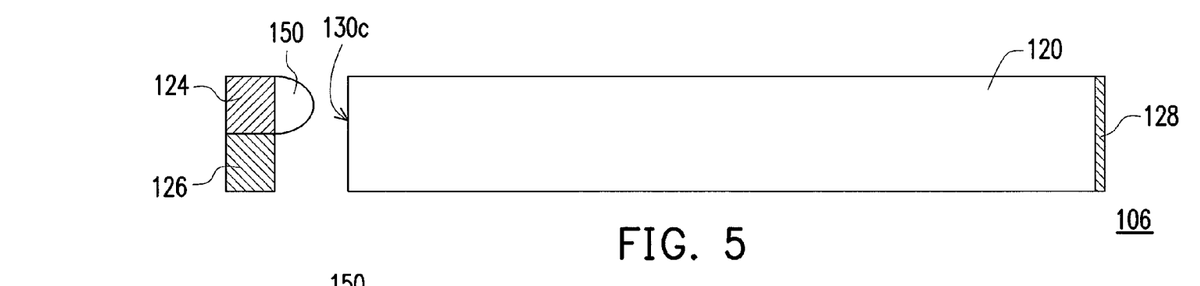
FIG. 5 and FIG. 6 are schematic diagrams showing the photocell vertical divergence angle (β) satisfies β<50° according to embodiments of the present invention.
Figure 6:
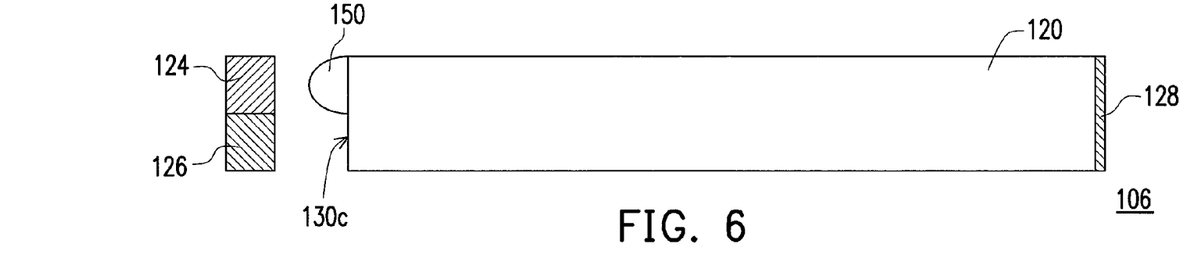

The photocell total reflection angle (α) satisfying θ<α<60° and the photocell vertical divergence angle (β) satisfying β<50°. may be achieved by the methods described in the following embodiments. FIG. 5 and FIG. 6 are schematic diagrams showing the photocell vertical divergence angle (β) satisfies β<50° according to embodiments of the present invention. Referring to FIG. 5, a condensing element 150 is disposed on the surface of the light source 124, and the condensing element 150 is a lenticular lens, for example. After the photocell L from the light source 124 is condensed by the condensing element 150, the photocell vertical divergence angle (β) of the photocell L may satisfy β<50°. Moreover, referring to FIG. 6, the condensing element 150 is disposed on the light incident surface 130c of the light guide plate 120. Similarly, the condensing element 150 is a lenticular lens, for example. After the photocell L from the light source 124 is condensed by the condensing element 150, the photocell vertical divergence angle (β) of the photocell L may satisfy β<50°. In FIG. 5 and FIG. 6, the condensing element 150 is disposed between the light source 124 and the light guide plate 120 so as to make the photocell vertical divergence angle (β) of the photocell L from the light source 124 to satisfy β<50°.

Figure 7:
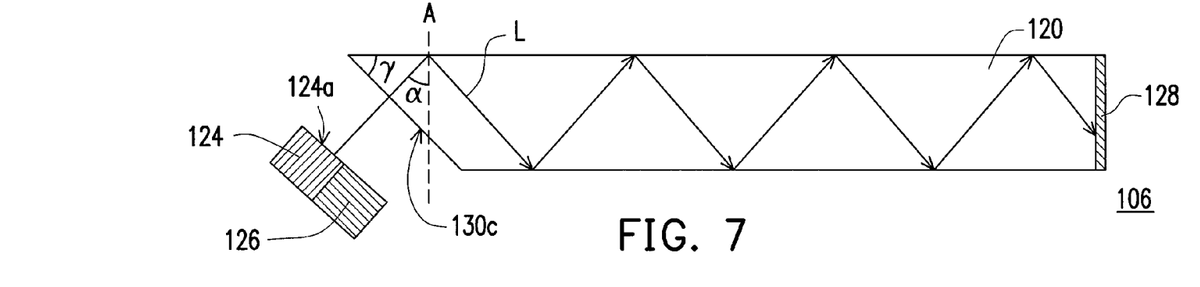
FIG. 7 is a schematic diagram showing the photocell total reflection angle (α) satisfies θ<α<60° according to an embodiment of the present invention.

FIG. 7 is a schematic diagrams showing the photocell total reflection angle (α) satisfies θ<α<60° according to an embodiment of the present invention. Referring to FIG. 7, an acute angle γ is formed between the light incident surface 130c of the light guide plate 120 and the top surface 130a of the light guide plate 120 so as to make the photocell total reflection angle (α) satisfying θ<α<60°. In order to make the photocell total reflection angle (α) satisfying θ<α<60°, the light emitting surface 124a of the light source 124 is parallel with the light incident surface 130c of the light guide plate 120, and the acute angle γ is between the light incident surface 130c of the light guide plate 120 and the top surface 130a of the light guide plate 120.

Figure 8:
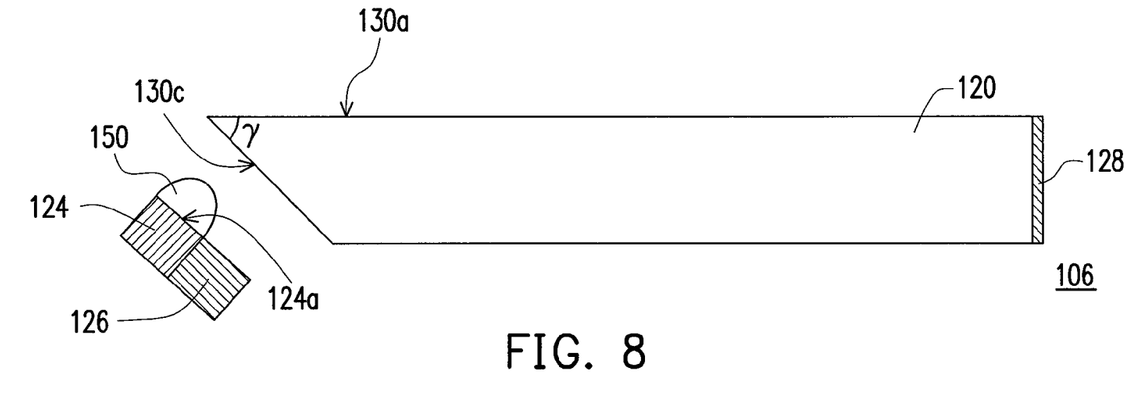
FIG. 8 and FIG. 9 are schematic diagrams showing the condensing element 150 and the acute angle γ in the touch panel according to embodiments of the present invention.
Figure 9:
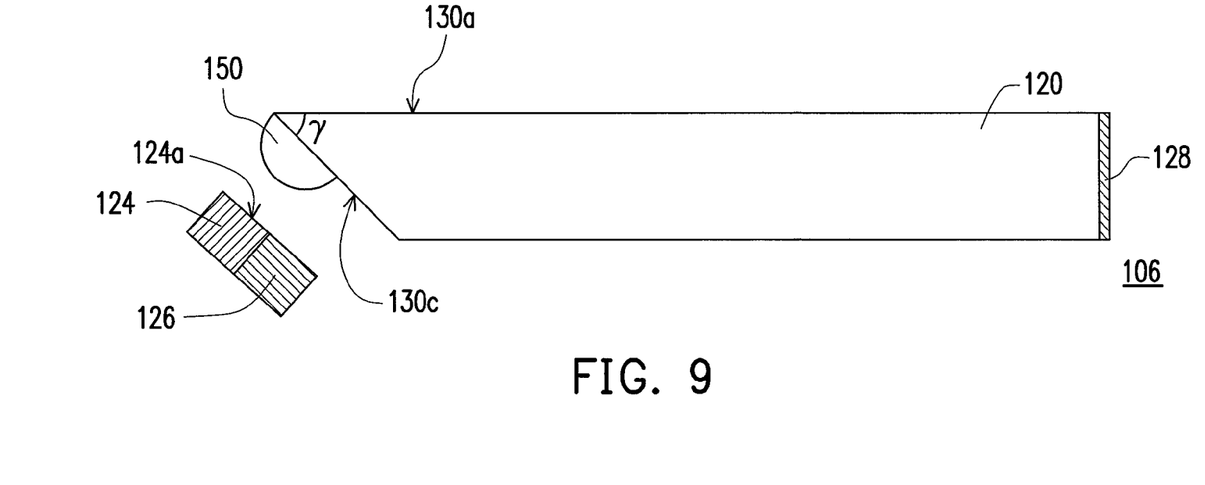

FIG. 8 and FIG. 9 are schematic diagrams showing the touch panel having the condensing element 150 and the acute angle γ according to embodiments of the present invention. Referring to FIG. 8, the condensing element 150 is disposed on the surface of the light source 124, and the acute angle γ is between the light incident surface 130c of the light guide plate 120 and the top surface 130a of the light guide plate 120. Therefore, the photocell total reflection angle (α) may satisfy θ<α<60° and the photocell vertical divergence angle (β) may satisfy β<50°. Referring to FIG. 9, the condensing element 150 is disposed on the surface of the light incident surface 130c of the light guide plate 120, and the acute angle γ is between the light incident surface 130c of the light guide plate 120 and the top surface 130a of the light guide plate 120.

Therefore, the photocell total reflection angle (α) may satisfy θ<α<60° and the photocell vertical divergence angle (β) may satisfy β<50°.

Figure 10:
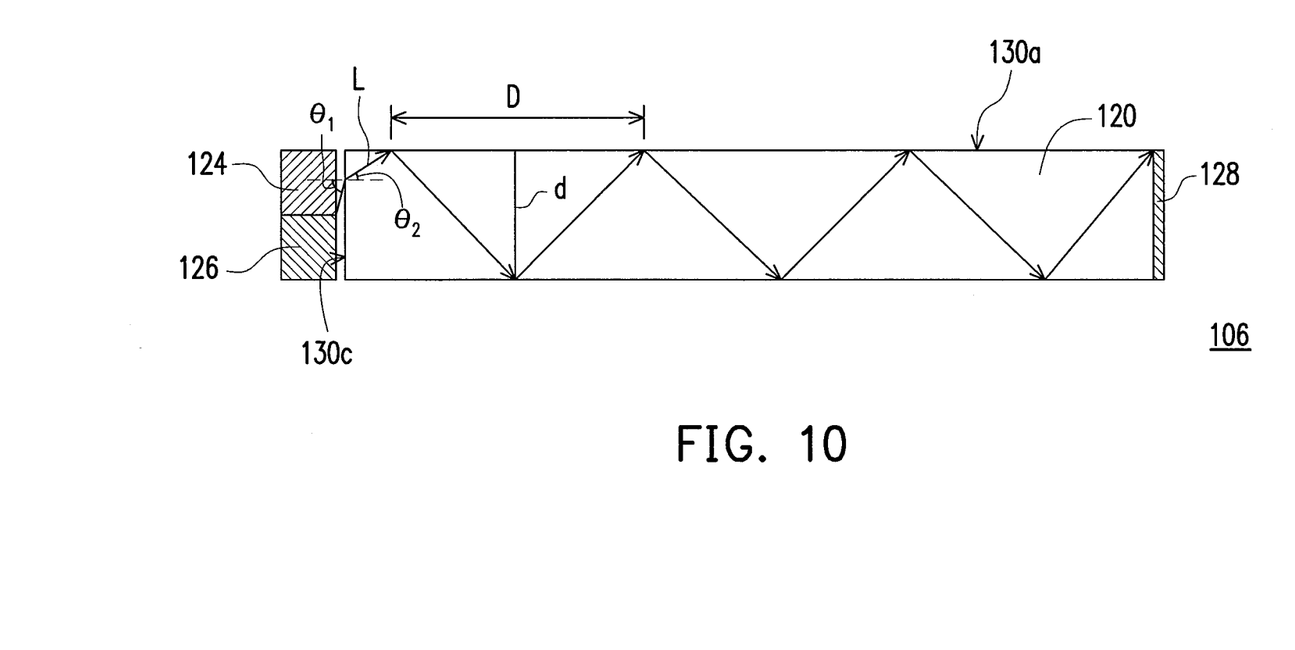
FIG. 10 is a side view of a touch panel according to an embodiment of the present invention.
Figure 11:
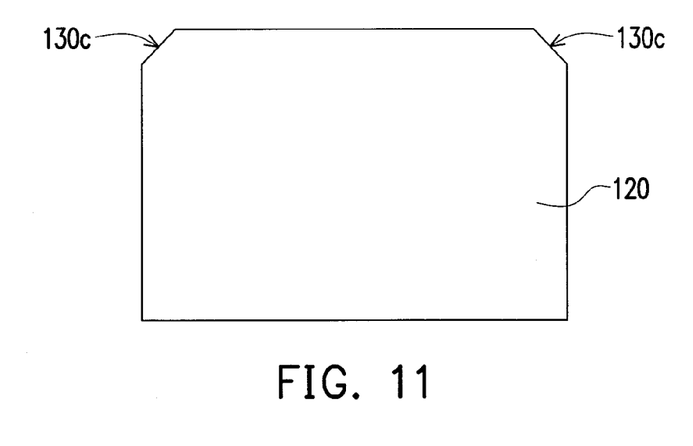
FIG. 11 and FIG. 12 are schematic diagrams showing the light guide plate according to embodiments of the present invention.

FIG. 10 is a side view of a touch panel according to an embodiment of the present invention. The touch panel 106 shown in FIG. 10 is similar to that shown in FIG. 3 and FIG. 4, the difference therebetween is the photocells L of the light source 124 in FIG. 10 have a total reflection bouncing distance (D) in the light guide plate 120, and D ≤10mm. Generally, a finger width is about 10mm, and thus the total reflection bouncing distance (D) ≤10mm may increase the number of the total reflection of the photocells L in the light guide plate 120, so as to increase the touch position density and the touch sensing sensitivity.

According to an embodiment, the total reflection bouncing distance (D) satisfies:

$$D = 2d \times \tan\left(90° - \sin^{-1}\left(\frac{n1\sin\theta1}{n2}\right)\right)$$

d is a thickness of the light guide plate,
n1 is the refractive index of air,
n2 is the refractive index of the light guide plate, and
θ1 is a light incident angle from the light source to the light guide plate.

That means, the total reflection bouncing distance D is related with the light incident angle θ1 and the thickness of the light guide plate d. The total reflection bouncing distance D ≤10mm may be achieved by adjusting the light incident angle θ1 and the thickness of the light guide plate d. Generally, the light incident angle θ1 is also related with the thickness of the light guide plate d, and the detectors 126 has a specific receiving angle (the receiving angle of the CMOS detector 126 is about 50° for example). Therefore, if the thickness of the light guide plate d is 1 mm, the light incident angle θ1 may be 15°~50°. If the thickness of the light guide plate d is 2mm, the light incident angle θ1 may be 30°~50°. Therefore, the total reflection bouncing distance (D) ≤10mm may be achieved by designing a specific light incident angle θ1 if the thickness of the light guide plate d is constant. In a preferred embodiment, the light source 126 is a light emitting diode (LED) having a butterfly-shaped light field.

According to another embodiment, the embodiment of FIG. 10 can be combined with the embodiment of FIG. 3 and FIG. 4. That means, in this embodiment, the photocells L of the light source 124 have a total reflection bouncing distance (D) in the light guide plate 120, and the light sources 124 have a photocell total reflection angle (α) and a photocell vertical divergence angle (β) corresponding to the light incident surfaces 130c of the light guide plate 120, wherein θ<α<60°, θ is a critical angle of the total reflection angle of the light guide plate, and β<50°.

Figure 12:
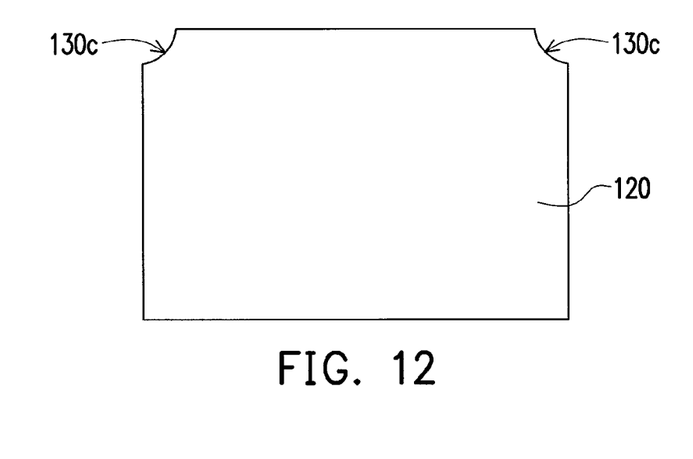

In the abovementioned embodiments, the light incident surfaces 130c of the light guide plate 120 are flat surfaces. However, the present invention is not limited herein. According to another embodiment, the light incident surfaces 130c of the light guide plate 120 may be curve surfaces (as shown in FIG. 12). If the light incident surfaces 130c of the light guide plate 120 are curve surfaces, the divergence angle of the light sources 124 on the XY plane may be increased.

Figure 13:
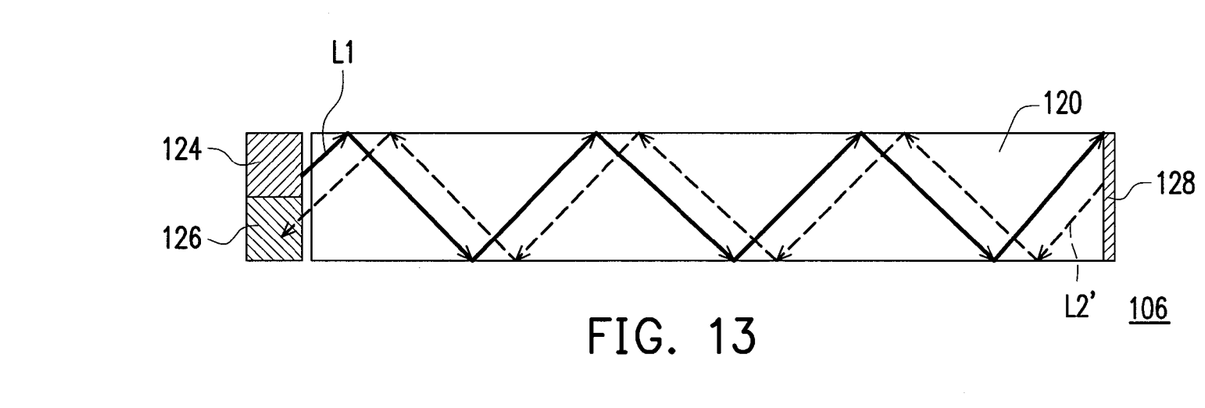
FIG. 13 and FIG. 14 are schematic diagrams showing the operation of the touch panel according to an embodiment of the present invention.
Figure 14:
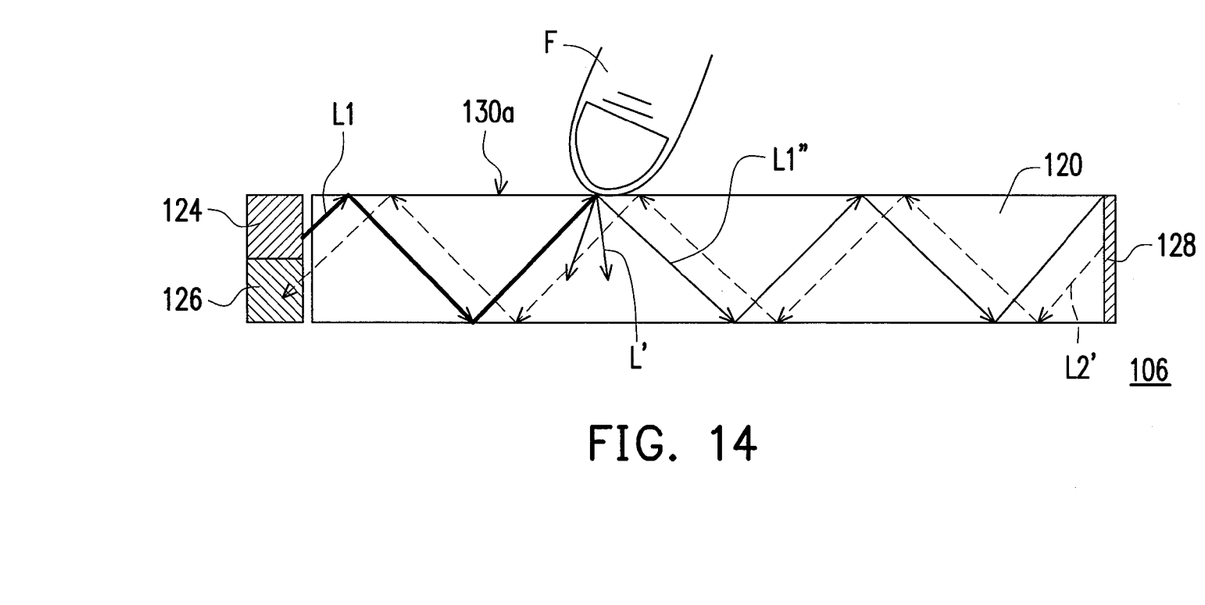

FIG. 13 and FIG. 14 are schematic diagrams showing the operation of the touch panel according to an embodiment of the present invention. Referring to FIG. 13, after the photocell L1 from the light source 124 enters the light guide plate 120, the photocell L1 continuously performs total reflection in the light guide plate 120 because the photocell total reflection angle (α) satisfies θ<α<60 and the photocell vertical divergence angle (β) satisfies β<50°, and then it is reflected by the reflective layer 128. Thereafter, the reflected photocell L2 continuously performs total reflection in the light guide plate 120, and then it is detected by the detectors 126. FIG. 13 shows the photocell of the light sources 124 performs total reflection in the light guide plate 120, in which a touch operation has not been performed yet. When the touch operation is performed on the touch panel 106, as shown in FIG. 14, which is when the finger F touches the top surface 130a of the light guide plate 120 to perform the touch operation, the total reflection of the photocells L1 of the light source 120 in the light guide plate 120 is damaged, and thereby a portion of the photocells L1' can not perform the total reflection and another portion of the photocells L1" may still perform the total reflection and is reflected by the reflective layer 128. The reflected photocell L2' may continuously perform total reflection in the light guide plate 120, and then be detected by the detectors 126. Since the total reflection of a portion of the photocells L1 is damaged by the touch operation, the photocell L1' which may continuously perform total reflection has a reduced intensity. As a result, the photocell signal intensity of the reflected photocell L2' detected by detector 126 is lower than that of the photocell L2 in FIG. 13. Therefore, the touch position can be determined through detecting the photocell signal intensity by the detector 126.

Figure 15:
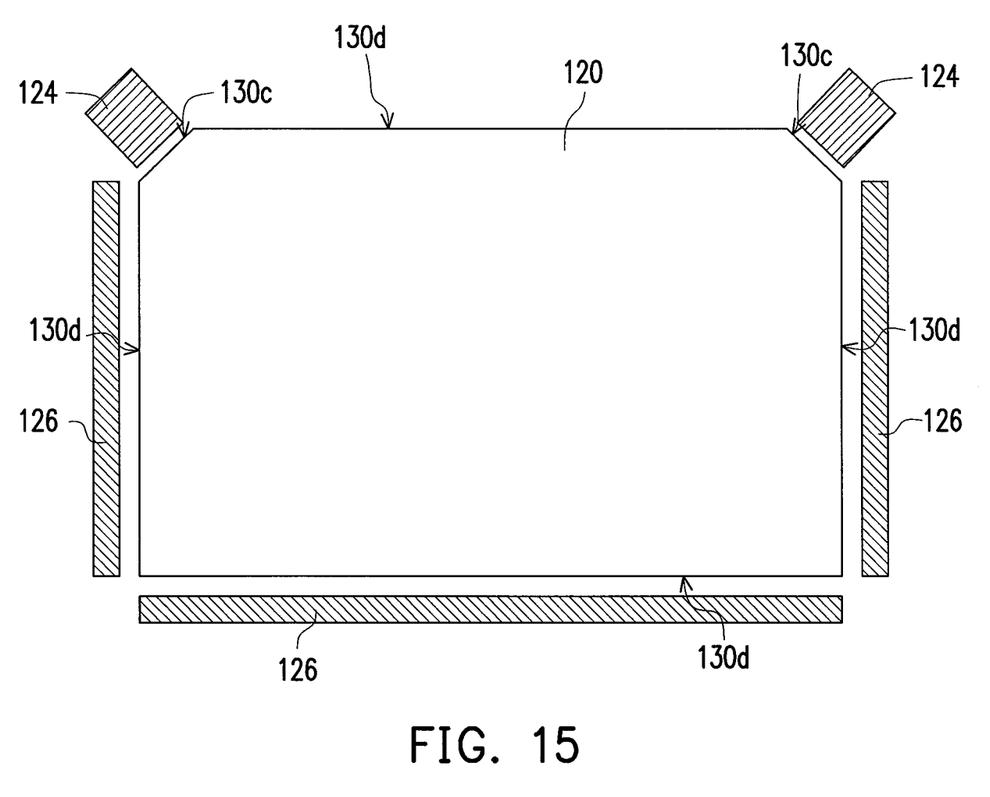
FIG. 15 is a top view of a touch panel according to another embodiment of the invention.

In the abovementioned embodiments, the detectors 126 of the touch panel 106 are disposed underneath the light sources 124, and the photocell signals are reflected into the detectors 126 by the reflective layer 128. However, the present invention is not limited to these embodiments. According to another embodiment, the detectors 126 may also be disposed at other positions. As shown in FIG. 15, the touch panel of FIG. 15 is similar to that of FIG. 2, and the difference therebetween is that the detectors 126 in FIG. 15 are disposed opposite to the light sources 124. In details, the detectors 126 are disposed on the side surfaces 130d of the light guide plate 120. As shown in the touch panel of FIG. 15, the light sources 124 are disposed on the two light incident surfaces 130c of the light guide plate 120, and the detectors 126 are disposed on at least three of the side surfaces 130d of the light guide plate 120. In the embodiment, the detectors 126 are light emitting diodes linearly arranged. In other words, the photocells from the light sources 124 may perform total reflection in the light guide plate 120, and then be detected by the detectors 126 on the side surfaces 130d of the light guide plate 120.

In view of the above, the light guide plate is disposed in the touch panel of the present invention, and therefore it has better mechanical strength and is not twisted easily comparing with the conventional optical touch panel having the hallow frame.

Moreover, the light sources of the touch panel have a photocell total reflection angle ($\alpha$) and a photocell vertical divergence angle ($\beta$), wherein $\theta<\alpha<60°$, $\theta$ is a critical angle of the total reflection angle of the light guide plate, and $\beta<50°$. When photocells of the light sources enter the light guide plate, the photocells perform total reflection in the light guide plate, and then the detectors can detect the photocell signals. Therefore, the error sensing signals, which are generated in the conventional touch panel because of the vertical divergence angle of the light source, are not generated.

Furthermore, because the photocells of the light sources have a total reflection bouncing distance (L)≤10 mm in the light guide plate, the sensing sensitivity of the touch panel is increased.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch panel, comprising:
    a light guide plate having a top surface, a bottom surface, a plurality of side surfaces and a plurality of light incident surfaces, wherein the side surfaces and the light incident surfaces connect the top surface and the bottom surface, and areas of the top surface and the bottom surface are larger than areas of the side surfaces and the light incident surfaces;
    a plurality of light sources, disposed at the light incident surfaces of the light guide plate, the light sources having a photocell total reflection angle ($\alpha$) and a photocell vertical divergence angle ($\beta$) corresponding to the light incident surfaces of the light guide plate, wherein $\theta<\alpha<60°$, $\theta$ is a critical angle of the total reflection angle of the light guide plate, and $\beta<50°$; and
    a plurality of detectors, disposed corresponding to the light sources so as to receive photocell signals from the light sources, wherein the detectors are disposed underneath the light sources on the same side of the light incident surfaces of the light guide plate.

2. The touch panel of claim 1, further comprising a plurality of condensing elements disposed between the light sources and the light guide plate, such that the light sources have the photocell vertical divergence angle ($\beta$)<50.

3. The touch panel of claim 2, wherein the condensing elements are disposed on surfaces of the light sources.

4. The touch panel of claim 2, wherein the condensing elements are disposed on the light incident surfaces of the light guide plate.

5. The touch panel of claim 1, wherein an acute angle is between the light incident surfaces of the light guide plate and the top surface of the light guide plate, such that the photocell total reflection angle ($\alpha$) of the light sources satisfies $\theta<\alpha<60°$.

6. The touch panel of claim 5, wherein light emitting surfaces of the light sources are parallel with the light incident surfaces of the light guide plate.

7. The touch panel of claim 1, further comprising a reflective layer disposed on at least three of the side surfaces of the light guide plate.

8. The touch panel of claim 1, wherein the detectors are disposed opposite to the light sources.

9. The touch panel of claim 8, wherein the detectors are disposed on at least three of the side surfaces of the light guide plate.

10. The touch panel of claim 1, wherein the light incident surfaces of the light guide plate are flat surfaces.

11. The touch panel of claim 1, wherein each of the detectors has a horizontal view angle and a vertical view angle, the horizontal view angle is larger than 90°, and the vertical view angle is any angle.

12. A touch display device, comprising:
    a display panel;
    a touch panel, disposed above the display panel and comprising:
        a light guide plate having a top surface, a bottom surface, a plurality of side surfaces and a plurality of light incident surfaces, wherein the side surfaces and the light incident surfaces connect the top surface and the bottom surface, and the display panel is disposed on the bottom surface of the light guide plate;

a plurality of light sources, disposed at the light incident surfaces of the light guide plate, the light sources having a photocell total reflection angle ($\alpha$) and a photocell vertical divergence angle ($\beta$) corresponding to the light incident surfaces of the light guide plate, wherein $\theta<\alpha<60°$, $\theta$ is a critical angle of the total reflection angle of the light guide plate, and $\beta<50°$;

a plurality of detectors, disposed corresponding to the light sources so as to receive photocell signals from the light sources, wherein the detectors are disposed underneath the light sources on the same side of the light incident surfaces of the light guide plate.

13. The touch display device of claim 12, wherein the touch panel further comprises a plurality of condensing elements disposed between the light sources and the light guide plate such that the light sources have the photocell vertical divergence angle ($\beta$)<50.

14. The touch display device of claim 13, wherein the condensing elements are disposed on surfaces of the light sources.

15. The touch display device 1 of claim 13, wherein the condensing elements are disposed on the light incident surfaces of the light guide plate.

16. The touch display device of claim 12, wherein an acute angle is between the light incident surfaces of the light guide plate and the top surface of the light guide plate, such that the photocell total reflection angle ($\alpha$) of the light sources satisfies $\theta<\alpha<60°$.

17. The touch display device of claim 16, wherein light emitting surfaces of the light sources are parallel with the light incident surfaces of the light guide plate.

18. The touch display device of claim 12, wherein the touch panel further comprises a reflective layer disposed on at least three of the side surfaces of the light guide plate.

19. The touch display device of claim 12, wherein the detectors are disposed opposite to the light sources.

20. The touch display device of claim 19, wherein the detectors are disposed on at least three of the side surfaces of the light guide plate.

21. The touch display device of claim 12, wherein the light incident surfaces of the light guide plate are flat surfaces.

22. The touch display device of claim 12, wherein each of the detectors has a horizontal view angle and a vertical view angle, the horizontal view angle is larger than 90°, and the vertical view angle is any angle.

23. The touch panel of claim 1, wherein the light incident surfaces of the light guide plate are curve surfaces.

24. The touch display device of claim 12, wherein the light incident surfaces of the light guide plate are curve surfaces.

* * * * *